US006817966B2

(12) United States Patent
Avers et al.

(10) Patent No.: US 6,817,966 B2
(45) Date of Patent: Nov. 16, 2004

(54) BRAKE SHIFT INTERLOCK SYSTEM WITH A SINGLE PARK POSITION SWITCH

(75) Inventors: Wayne Melvin Avers, Livonia, MI (US); Carrie Hildinger, Ferndale, MI (US); Boris L. Khaykin, West Bloomfield, MI (US); Keri Przebienda, Northville, MI (US); Dave John Rutkowski, Grosse Ile, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/230,555

(22) Filed: Aug. 29, 2002

(65) Prior Publication Data

US 2004/0043865 A1 Mar. 4, 2004

(51) Int. Cl.[7] ........................ B60K 41/20; B60K 41/46; F16H 59/74; F16D 3/14; F16D 47/02
(52) U.S. Cl. ............................ 477/96; 477/94; 477/99; 192/220.2; 192/220.4
(58) Field of Search ............................ 477/96, 94, 97, 477/99; 192/219.4, 220.2, 220.4, 220.3

(56) References Cited

U.S. PATENT DOCUMENTS

| | | | |
|---|---|---|---|
| 4,273,224 A | * | 6/1981 | Brown et al. ............... 477/95 |
| 4,474,085 A | | 10/1984 | DeVogelaere et al. |
| 5,009,295 A | | 4/1991 | Kinkade et al. |
| 5,031,736 A | * | 7/1991 | Kobayashi et al. ...... 192/220.2 |
| 5,076,114 A | | 12/1991 | Moody |
| 5,176,231 A | | 1/1993 | Moody et al. |
| 5,428,977 A | | 7/1995 | Knape |
| 5,445,575 A | | 8/1995 | Sundeen |
| 5,489,246 A | | 2/1996 | Moody et al. |
| 5,562,568 A | | 10/1996 | Smale |
| 5,647,464 A | | 7/1997 | Snell et al. |
| 5,647,465 A | | 7/1997 | Burkhard et al. |
| 5,647,818 A | | 7/1997 | Moody |
| 5,657,654 A | | 8/1997 | Hoebel |
| 5,696,679 A | | 12/1997 | Marshall et al. |
| 5,729,187 A | | 3/1998 | Moody et al. |
| RE35,772 E | | 4/1998 | Ratje et al. |
| 5,846,158 A | | 12/1998 | Tazai |
| 5,846,160 A | | 12/1998 | Tuday |
| 5,853,348 A | | 12/1998 | Lehman |
| 5,862,899 A | | 1/1999 | Dahlstrom |
| 5,902,209 A | | 5/1999 | Moody |
| 5,938,562 A | | 8/1999 | Withey |
| 6,059,687 A | | 5/2000 | Durieux et al. |
| 6,142,282 A | | 11/2000 | Rudisil et al. |
| 6,176,810 B1 | | 1/2001 | Eschrich et al. |
| 6,295,887 B1 | | 10/2001 | DeJonge et al. |
| 6,308,813 B1 | | 10/2001 | Carlson |
| 6,316,891 B1 | | 11/2001 | Hough |
| 2002/0000759 A1 | | 1/2002 | Harada et al. |

FOREIGN PATENT DOCUMENTS

JP            04303024 A    * 10/1992    ........... B60K/23/00

* cited by examiner

Primary Examiner—Tisha Lewis
(74) Attorney, Agent, or Firm—Brinks Hofer Gilson & Lione

(57) ABSTRACT

An apparatus and method is provided for an improved brake shift interlock system which eliminates the need of a redundant park position switch. The number of components is minimized due to an incorporation of a latch within the brake shift interlock system. The apparatus also eliminates the need of a cam and wiring harness, as well as manual labor traditionally required to install these components.

11 Claims, 5 Drawing Sheets

BRAKE SHIFT INTERLOCK SYSTEM WITH A SINGLE PARK POSITION SWITCH

FIELD OF THE INVENTION

The present invention relates generally to a brake shift interlock for a transmission shift lever and more specifically to a brake shift interlock in combination with an ignition interlock.

BACKGROUND OF THE INVENTION

Many of the present day automotive vehicles having automatic transmissions use electronically controlled mechanisms to establish the operating condition of the transmission. These control systems typically include solenoids, switches, and electronic circuitry.

For reasons of safety and government regulation, it is required that these automatic transmissions incorporate transmission shift-lock capability wherein the transmission shift lever and the ignition switch have limited movement unless certain conditions are met. In accordance with the shift-lock function, when starting the vehicle, the transmission shift lever can be moved out of the park position only if the driver presses on the brake pedal and if the key is turned so as to be in the run position. Various systems have been proposed and utilized to achieve a combined brake shift interlock and ignition switch interlock function, but these prior art systems have been complicated and expensive in construction. Current systems which combine both the brake shift interlock and ignition switch interlock functions utilize at least two sensors for detecting different positions of a park position switch and an ignition switch. Traditionally, at least two sensors are utilized because of a range of motion in which to clear the lock mechanism when shifting from a park position to a non-park position. For instance, the brake shift interlock is required to maintain a lever releasing condition until the transmission shift lever is completely or fully out of park position. On the other hand, the ignition switch interlock is required to not change state unless the transmission shift lever is completely or fully in the park position.

It would be desirable, therefore, to provide a brake shift interlock system which reduces the complexity of these systems and provides greater robustness and reliability during construction and operation of the system.

SUMMARY OF THE INVENTION

The present invention overcomes the disadvantages of the prior art approaches by providing a brake shift interlock system for a vehicle which includes a minimum of additional mechanical componentry and complexity needed to effect the desired locking of the transmission gear shift. The brake shift interlock system has a transmission shift lever and a brake pedal. The system comprises a shift solenoid which provides a mechanical stop for the transmission shift lever while in a first position. A park position sensor is included for sensing whether the transmission shift lever is in a predetermined shift position and a brake pedal position sensor is included for sensing whether the brake pedal is in a predetermined pedal position.

The invention provides a latch and driver circuit electrically connected to the shift solenoid, the park position sensor, and the brake pedal position sensor, wherein the latch and driver circuit energizes the shift solenoid when the transmission shift lever is in the predetermined shift position and when the brake pedal position sensor senses the predetermined pedal position. Furthermore, the latch and driver circuit continuously energize the shift solenoid for as long as the brake pedal continues to be in the predetermined pedal position even after the transmission shift lever is no longer in a full-park position. The latch and driver circuit de-energizes the shift solenoid when the brake pedal is no longer in the predetermined pedal position.

It is also an object of this invention to provide a method of operation for the brake shift interlock system wherein the invention senses a predetermined shift position of the transmission shift lever. The predetermined shift position of this invention is preferably the full-park position. Additionally, this invention senses a predetermined pedal position of the brake pedal, wherein the predetermined pedal position of the brake pedal is a depressed position. Moreover, this invention energizes a shift solenoid within the brake shift interlock system when both the brake pedal is in the predetermined pedal position and the transmission shift lever is in the predetermined shift position. This invention energizes the shift solenoid for as long as the brake pedal continues to be in the predetermined pedal position even if the shift lever moves out of the Park position. The shift solenoid is de-energized when the brake pedal is applied and the transmission shift lever is not in the full-park position.

These and other advantages, features and objects of the invention will become apparent from the drawings, detailed description and claims which follow.

DETAILED DESCRIPTION OF THE PREFERRED EMBODIMENT(S)

Figure 1:
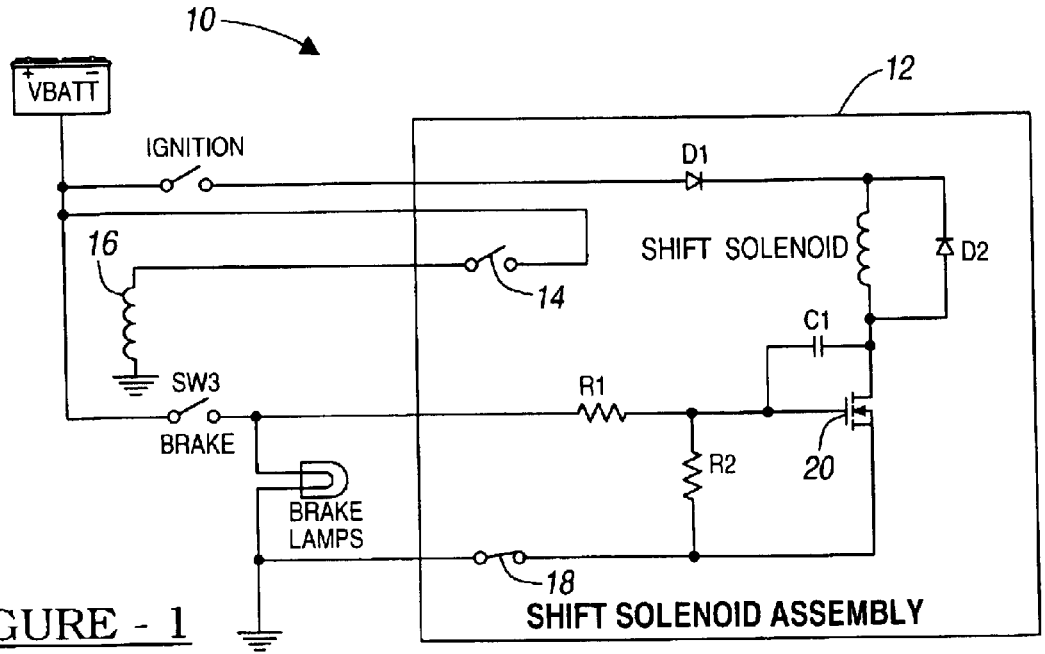
FIG. 1 is a schematic diagram of a prior art brake shift interlock system.
Figure 2:
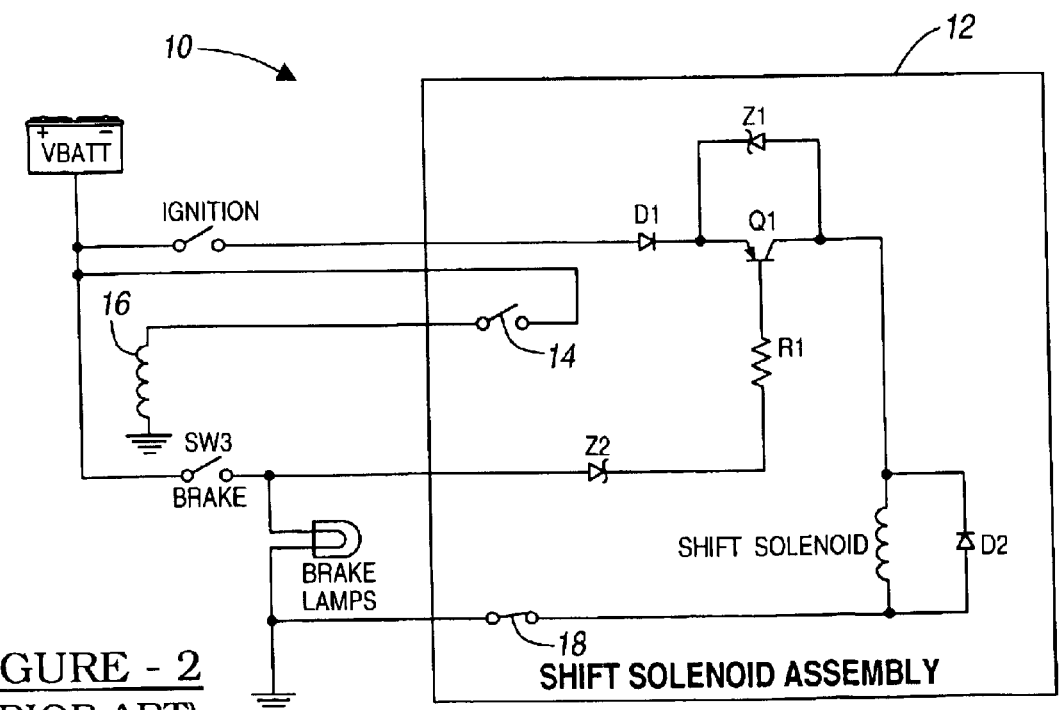
FIG. 2 is a schematic diagram of a prior art brake shift interlock system.

Referring now to the drawings, FIG. 1 shows a prior art brake shift interlock system (hereinafter referred to as BSI) 10, which includes a shift solenoid assembly 12, a first park position switch 14 that is electrically connected to an ignition switch solenoid 16, and a power source. A second park position switch 18 is included which is electrically connected to a field effect transistor 20. The first park position switch 14 senses when the position of a vehicle's transmission shift lever is fully in the park position. The second park position switch 18 senses when the position of the vehicle's transmission shift lever is fully out of the park position. The first park position switch 14 and the second park position switch 18 are required in the prior art BSI system because neither the first park position switch 14 or the second park position switch 18, independently, is capable of sensing both the transmission shift lever fully in the park position and out of the park position. FIG. 2 shows an alternative embodiment of the prior art BSI system 10 shown in FIG. 1.

Figure 3:
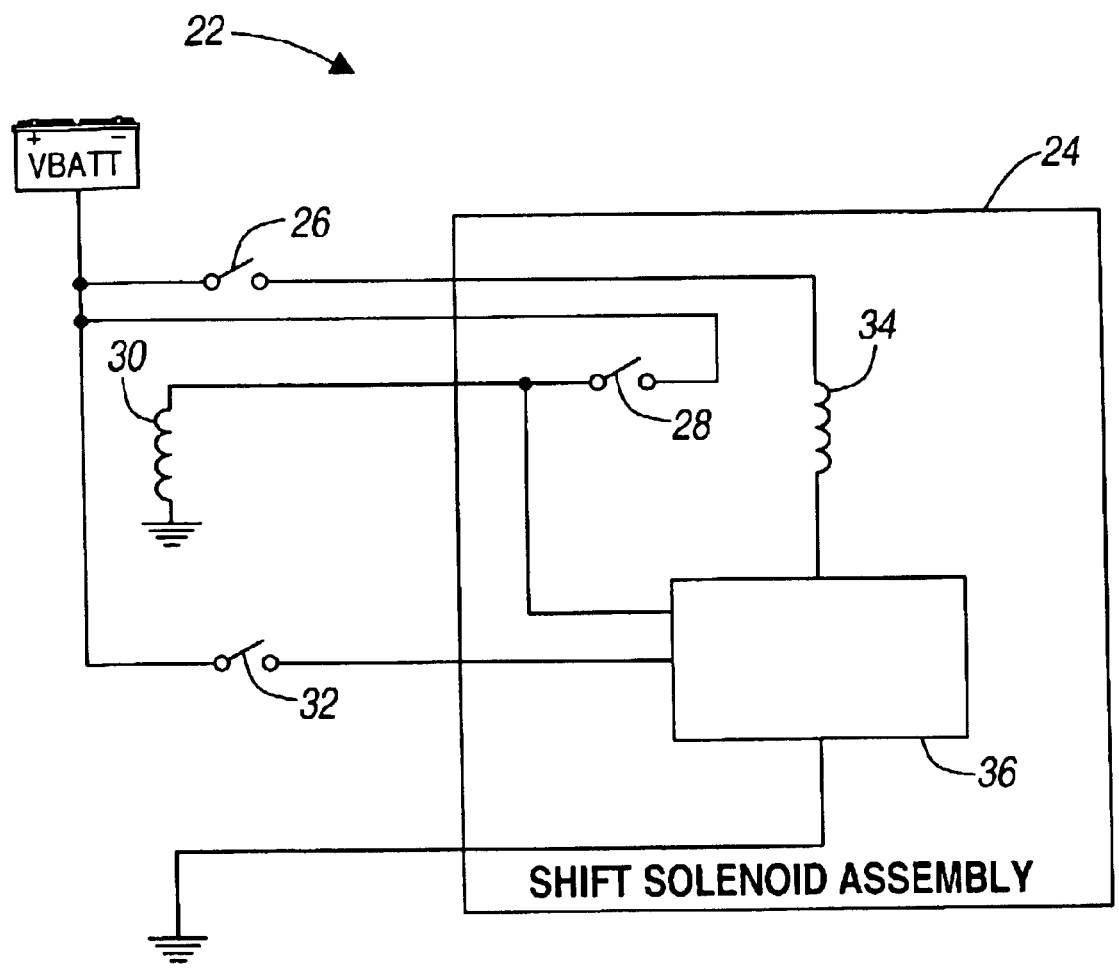
FIG. 3 is a simplified block diagram of a brake shift interlock system according to the present invention.

FIG. 3 shows a simplified block diagram of a BSI system 22 o the present invention. The BSI system 22 includes an ignition switch 26 which is moveable between an on and off position thereby allowing the flow of electric current when in an on position and an ignition switch solenoid 30 that is de-energized when a park position sensor 28 senses a predetermined shift position of a transmission shift lever (not shown). When the ignition switch solenoid 30 is energized the position of the ignition switch 26 cannot be moved to the off position. In a preferred embodiment the park position sensor 28 is an electrical switch and the predetermined shift position of the transmission shift lever is a full-park position. A full-park position occurs when the transmission shift lever is securely positioned in PARK completely at the end of motion within the PARK range. Hereinafter, the term full-park position shall also be referred to as PARK. A non-PARK position occurs when the transmission shift lever is in any position other than the full-park position. Preferably, the park position sensor 28 is in a closed state when the transmission shift lever is in the non-PARK position. The park position sensor 28 is in an open position when the transmission shift lever is in the PARK position. A brake pedal position sensor 32 senses whether or not a vehicle brake pedal (not shown) is in a predetermined pedal position. In one embodiment the brake pedal position sensor 32 is an electrical switch. The predetermined pedal position occurs when the brake pedal is pressed by a vehicle operator and preferably when the brake pedal position sensor 32 is in the closed position. The park position sensor 28 is packaged in a shift solenoid assembly 24, wherein the shift solenoid assembly 24 also includes a shift solenoid 34 and a latch and driver circuit 36.

The latch and driver circuit 36 is electrically connected to the shift solenoid 34, the park position sensor 28, and the brake pedal position sensor 32. When the vehicle operator positions the transmission shift lever in the PARK position and presses the brake pedal, the latch and driver circuit 36 energizes the shift solenoid 34 thereby causing the plunger (not shown) of the shift solenoid 34 to retract into a non-extended position. Preferably, the plunger within the shift solenoid 34 is normally in an extended position when de-energized, which prevents the movement of the transmission shift lever. Once the latch and driver circuit 36 energizes the shift solenoid on the occurrence of the above conditions, the latch and driver circuit 36 will continuously energize the shift solenoid 34 as long as the brake pedal continues to be in the predetermined pedal position and the ignition switch 26 is in the on position. Once the brake pedal is released by the vehicle operator and no longer in the predetermined pedal position, the latch and driver circuit 36 de-energizes the shift solenoid 34 by preventing the flow of electric current to the shift solenoid 34. During subsequent driving and while the shift lever is in the non-Park position, the shift solenoid 34 remains de-energized even if the brake pedal is pressed again.

Normally, the sequence for driving is as follows: the transmission shift lever is in the PARK position, wherein the park position sensor 28 is open. The brake pedal is applied, wherein the brake pedal position sensor 32 is closed. The shift solenoid 34 becomes energized and the transmission shift lever is then capable of being moved to a non-PARK position such as "DRIVE". The shift solenoid 34 continues to be energized as long as the brake pedal is in a depressed position and even after the transmission shift lever is no longer in the full-park position. When the brake pedal is released the shift solenoid is de-energized and subsequent brake applications by the vehicle operator while the transmission shift lever is in the non-PARK position will not energize the shift solenoid 34. When the transmission shift lever is again placed in the PARK position the shift solenoid 34 will be energized each time the Brake is applied. In the present invention, it is not necessary for the park position sensor 28 to remain open in order to continuously energize the shift solenoid 34. The shift solenoid 34 is latched on by the occurrence of a depressed brake pedal and when the transmission shift lever is in the full-park position. The shift solenoid 34 remains latched on even in the event that the transmission shift lever is out of the full-park position until the brake pedal is released.

Figure 4:
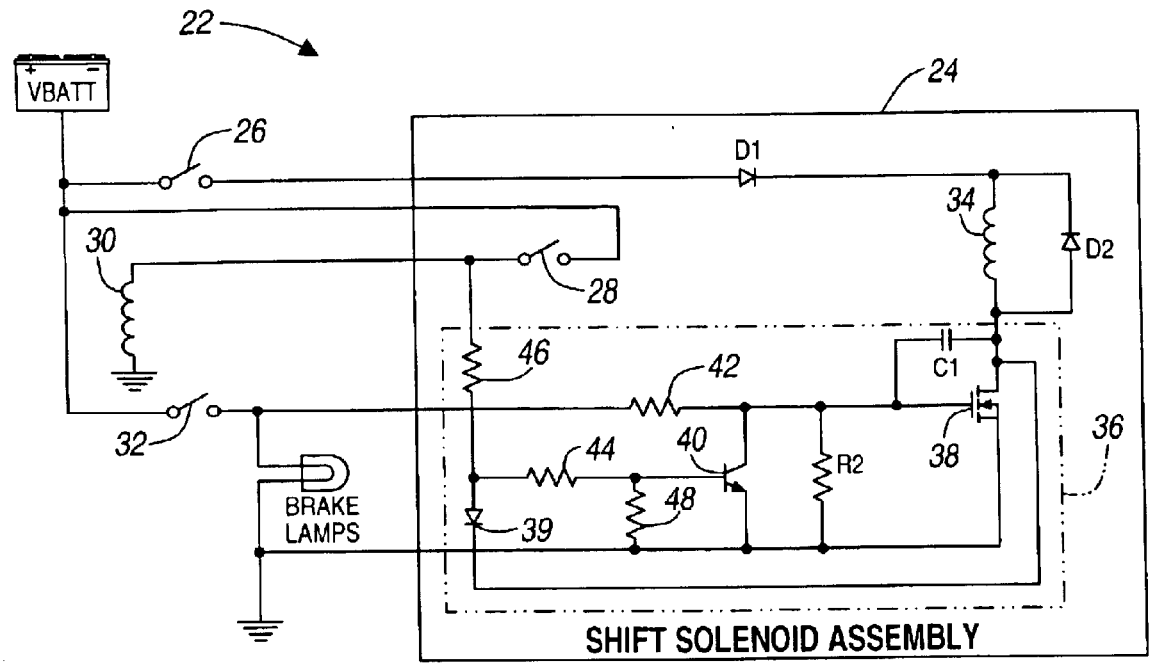
FIG. 4 is a detailed schematic diagram of a brake shift interlock system according to the present invention.
Figure 5:
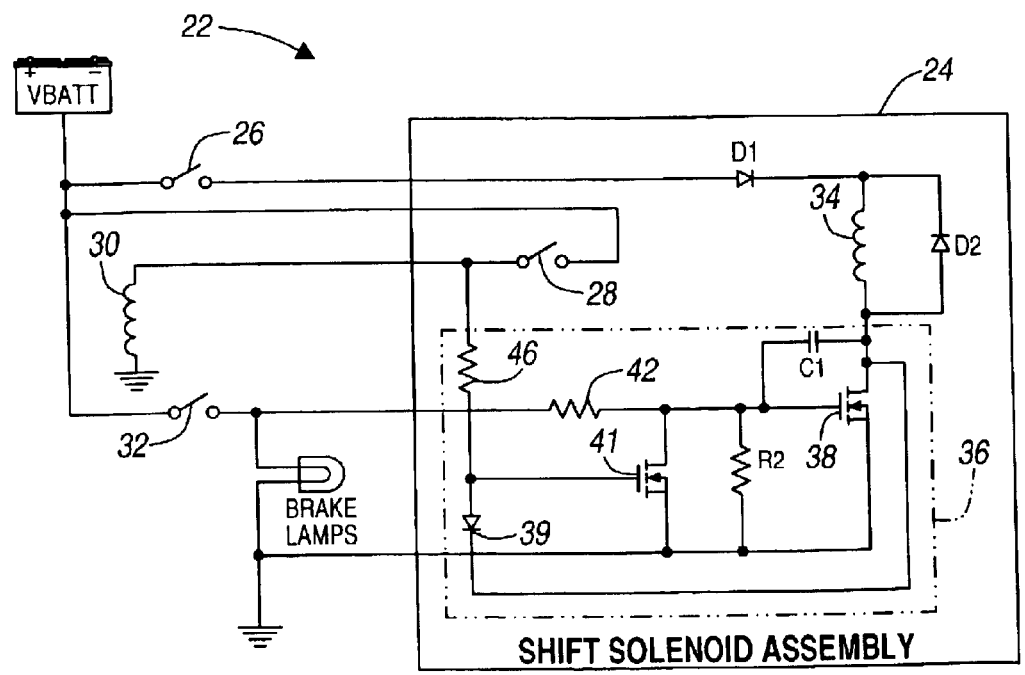
FIG. 5 is a detailed schematic diagram of a brake shift interlock system according to the present invention.

In FIG. 4 is shown a detailed schematic diagram of the present invention. The park position sensor 28 is preferably in an open position when the transmission shift lever is in the PARK position. During this event, no voltage signal is applied to a first resistor 46 and a second transistor 40 is biased in the off state. When the vehicle operator places the brake pedal in a depressed position and the second transistor 40 is in the off state, a first transistor 38 is energized as a result of a positive voltage applied to its gate. When the first transistor 38 is energized, the cathode of a diode 39 is pulled near zero volts and the junction of the first resistor 46 and a second resistor 44 are also pulled to a low voltage. The appearance of a low voltage at the junction of the first resistor 46 and the second resistor 44 prevents the second transistor 40 from turning on even in the event that the park position sensor 28 senses the transmission shift lever in a non-PARK position which enables a high voltage to be applied to the first resistor 46. The first transistor 38 is latched on for as long as the brake pedal position sensor 32 is closed. If the transmission shift lever is in the non-Park position and the vehicle operator releases the brake pedal, the first transistor 38 is de-energized or turned off. The cathode of diode 39 is therefore no longer pulled to a low voltage and the second transistor 40 is energized or turned on. With the second transistor 40 in an energized state, the collector of the second transistor 40 will be pulled to near zero volts and the first transistor 38 will not be energized as a result of the vehicle operator pressing the brake pedal. FIG. 5 illustrates a second embodiment of the present invention utilizing a field effect transistor 41 instead of a bipolar junction transistor in place of the second transistor 40.

Figure 6:
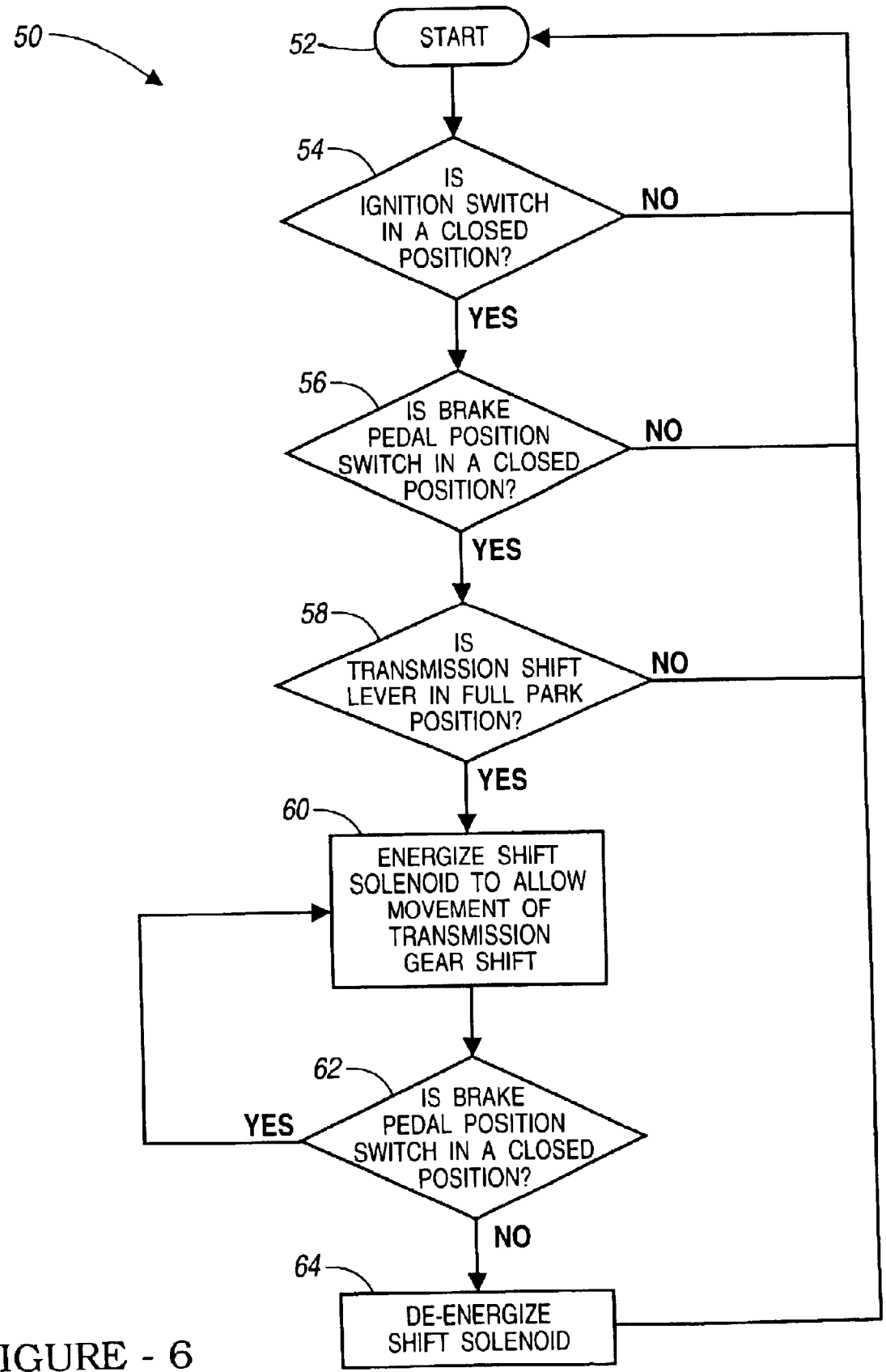
FIG. 6 is a flow chart illustrating the functions of a brake shift interlock system according to the present invention.

Referring to FIG. 6, a flow chart is shown which illustrates the operation of the brake shift interlock system 22. A step 52 is the entry point for a method 50. At a step 54, the method 50 senses whether the ignition switch 26 is in a closed position, if not, the method loops back to the step 52. In the event that the ignition switch 26 is in a closed position, a step 56 occurs. At the step 56, the brake pedal position sensor 32 senses a predetermined pedal position of the brake pedal. Preferably, the predetermined pedal position of the brake pedal is a depressed position. The depressed position of the brake pedal normally occurs when the vehicle operator has pressed the brake pedal. In the event that the brake pedal position sensor senses the brake pedal in the depressed position, a step 58 occurs, if not, the method 50 loops back to the step 52. At the step 58, the park position sensor senses a predetermined shift position of the transmission shift lever. In the preferred embodiment, the predetermined shift position of the transmission shift lever occurs when the transmission shift lever is in the full-park position. If the park position sensor senses the transmission shift lever in the full-park position a step 60 occurs, if not, the method 50 loops back to the step 52. At the step 60, the shift solenoid is energized. Energizing the shift solenoid will allow the vehicle operator to move the transmission shift lever. At the step 62, the brake pedal position sensor senses whether the brake pedal remains in a depressed position, if so, the method 50 loops back to the step 60. When the brake pedal position sensor senses that the brake pedal is not in a depressed position a step 64 occurs. At the step 64, the shift solenoid is de-energized. The method 50 then loops back to the step 52.

Figure 7:
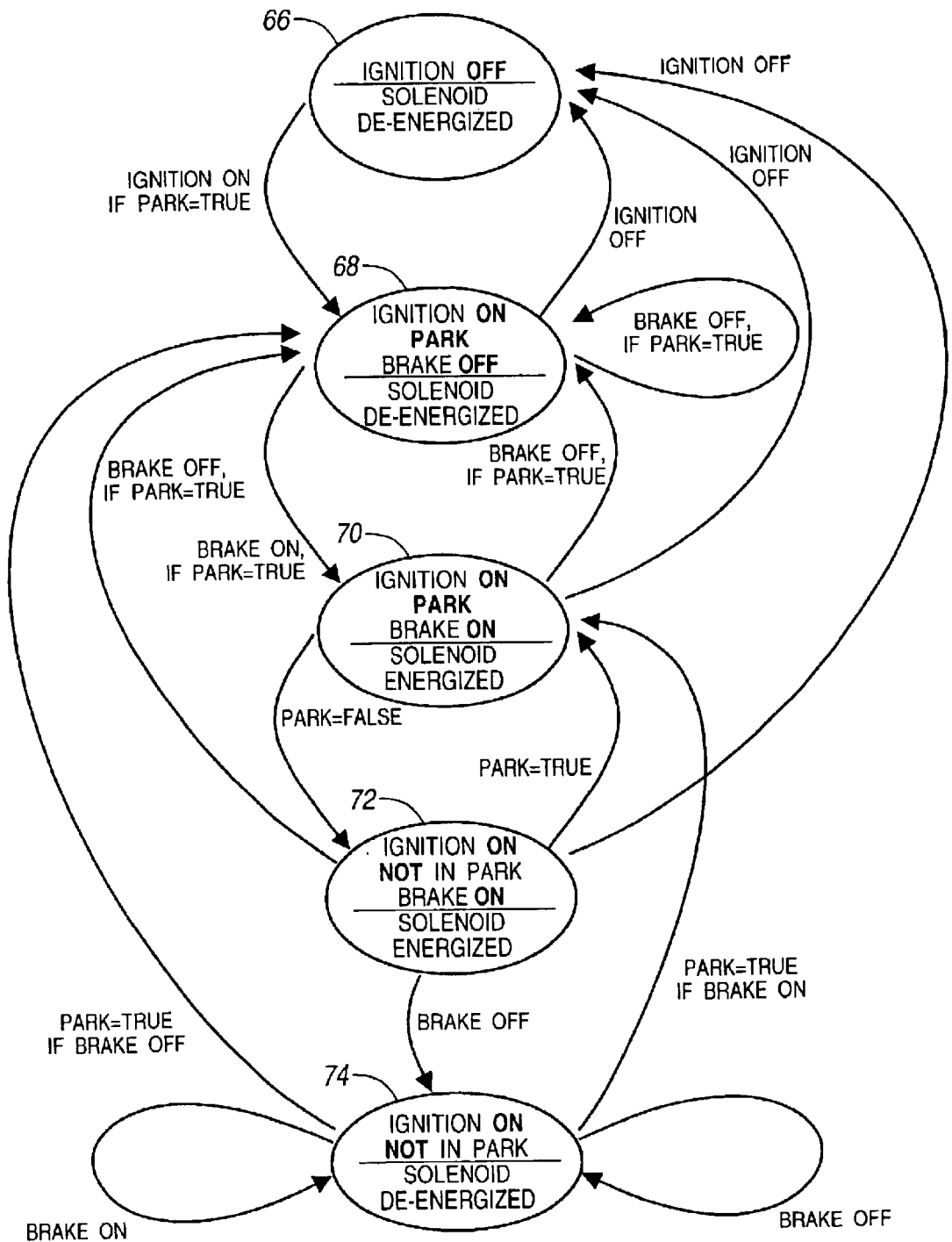
FIG. 7 is a state diagram showing the state of the present invention when various conditions occur.

The method of the BSI system 22 is shown in greater detail in FIG. 7. A state 66 occurs when the vehicle operator positions the ignition switch in the off position which results in the shift solenoid being de-energized or in the off position. A state 68 occurs when the ignition switch is in the on position, the transmission shift lever is in the PARK position, and the brake pedal position sensor does not sense the brake pedal in a depressed position. When the conditions at state 68 are met the shift solenoid is in an extended position, for instance de-energized. A state 70 occurs when the ignition switch is in the on position, the transmission shift lever is in the PARK position, and when the brake pedal position sensor senses the brake pedal in a depressed position. When the conditions at the state 70 occur, the shift solenoid is in a non-extended or energized position. A state 72 occurs when the ignition switch is in the on position, the transmission shift lever is in a non-PARK position, and the brake pedal is in a depressed position. On the event that the conditions in the state 72 are met, the shift solenoid is in the on or energized position. A state 74 occurs when the ignition switch is in the on position and the transmission shift lever is in the non-park position. When the conditions in the state 74 occur, the solenoid is in the extended or de-energized position. At the state 74, the position of the brake pedal is not dispositive as to the state position of the solenoid.

Various other modifications to the present invention may occur to those skilled in the art to which the present invention pertains. Other modifications not explicitly mentioned herein are also possible and within the scope of the present invention. It is the following claims, including all equivalents, which define the scope of the present invention.

What is claimed is:

1. A brake shift interlock system for a vehicle having a transmission shift lever moveable between a park and a non-park position and a brake pedal movable between a released and a depressed position, the system comprising:
    a shift solenoid having an energized and a de-energized state, said shift solenoid being a mechanical stop of movement of the transmission shift lever from the park position when in said de-energized state;
    a park position sensor for sensing whether the transmission shift lever is in the park position;
    a brake pedal position sensor for sensing whether the brake pedal is in the depressed position; and
    a latch and driver circuit electrically connected to the shift solenoid, the park position sensor, and the brake pedal position sensor, the latch and driver circuit initially energizing the shift solenoid when:
    (a) the park position sensor senses that the transmission shift lever in the park position and
    (b) the brake pedal position sensor senses that the brake pedal is in the depressed position,
    said latch and driver circuit continuously energizing the shift solenoid as long as the brake pedal position sensor senses that the brake pedal is in the depressed position regardless of further indications from park position senor, the latch and driver circuit de-energizing the shift solenoid when the brake pedal position sensor senses that the brake pedal is no longer in the depressed position regardless of further indications from the park position sensor.

2. A system according to claim 1, wherein the shift solenoid is normally in an extended position.

3. A system according to claim 2, wherein the extended position of the shift solenoid normally occurs when the shift solenoid is not energized.

4. A system according to claim 1, wherein the park position sensor is an electrical switch.

5. A system according to claim 1, wherein the brake pedal position sensor is an electrical switch.

6. A brake shift interlock system for a vehicle having a transmission shift lever movable between a park and a non-park position and a brake pedal movable between a released and a depressed position, the system comprising:
    an ignition switch movable between an on and off position;
    a shift solenoid having an energized and a de-energized state, said shift solenoid being a mechanical stop of movement of the transmission shift lever from the park position when in said de-energized state;
    a park position sensor for sensing whether the transmission shift lever is in the park position;
    a brake pedal position sensor for sensing whether the brake pedal is in the depressed position; and
    a latch arid driver circuit electrically connected to the shift solenoid, the ignition sensor, the park position sensor, and the brake pedal position sensor, the latch and driver circuit initially energizing the shift solenoid when:
    (a) the park position sensor senses that the transmission shift lever is in the park position and
    (b) the brake pedal position sensor senses that the brake pedal is in the depressed position,
    said latch and driver circuit continuously energizing the shift solenoid as long as the brake pedal position sensor senses that the brake pedal is in the depressed position regardless of further indication from the park position sensor, the latch and driver circuit de-energizing the shift solenoid when the ignition switch is in the off position or the brake pedal position sensor senses that the brake pedal is no longer in the depressed position regardless of further indications from the park position sensor.

7. A system according to claim 6, wherein the shift solenoid is normally in an extended position.

8. A system according to claim 6, wherein the extended position of the shift solenoid normally occurs when the shift solenoid is not energized.

9. A system according to claim 6, wherein the park position sensor is an electrical switch.

10. A system according to claim 6, wherein the brake pedal position sensor is an electrical switch.

11. A method of operation for a brake shift interlock system for a vehicle having a transmission shift lever, an ignition switch having an off position, a brake pedal, and a shift solenoid for either allowing or preventing movement of the transmission shift lever, the method comprising the steps of:
    sensing a park position of the transmission shift lever;
    sensing a depressed position of the brake pedal;
    energizing the shift solenoid when both the brake pedal is in the depressed position and the transmission shift is in the park position, and then for as long as the brake pedal is in the depressed position even after the transmission shift lever is no longer the park position; and
    de-energizing the shift solenoid when the ignition switch is in the off position or the brake pedal is no longer in the depressed position regardless of further indications from the park position sensor.

* * * * *

UNITED STATES PATENT AND TRADEMARK OFFICE
CERTIFICATE OF CORRECTION

PATENT NO. : 6,817,966 B2
DATED : November 16, 2004
INVENTOR(S) : Wayne M. Avers et al.

It is certified that error appears in the above-identified patent and that said Letters Patent is hereby corrected as shown below:

Column 5,
Line 57, before "the latch" delete "senor," and substitute -- sensor, --.

Column 6,
Line 15, after "a latch" delete "arid" and substitute -- and -- in its place.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,817,966 B2
APPLICATION NO. : 10/230555
DATED : November 16, 2004
INVENTOR(S) : Wayne M. Avers et al.

It is certified that error appears in the above-identified patent and that said Letters Patent is hereby corrected as shown below:

Column 5,
Line 57, before "the latch" delete "senor," and substitute -- sensor, --.

Column 6,
Line 20, after "a latch" delete "arid" and substitute -- and -- in its place.

This certificate supersedes Certificate of Correction issued May 10, 2005.

Signed and Sealed this

Twenty-seventh Day of March, 2007

JON W. DUDAS
*Director of the United States Patent and Trademark Office*